UNITED STATES PATENT OFFICE.

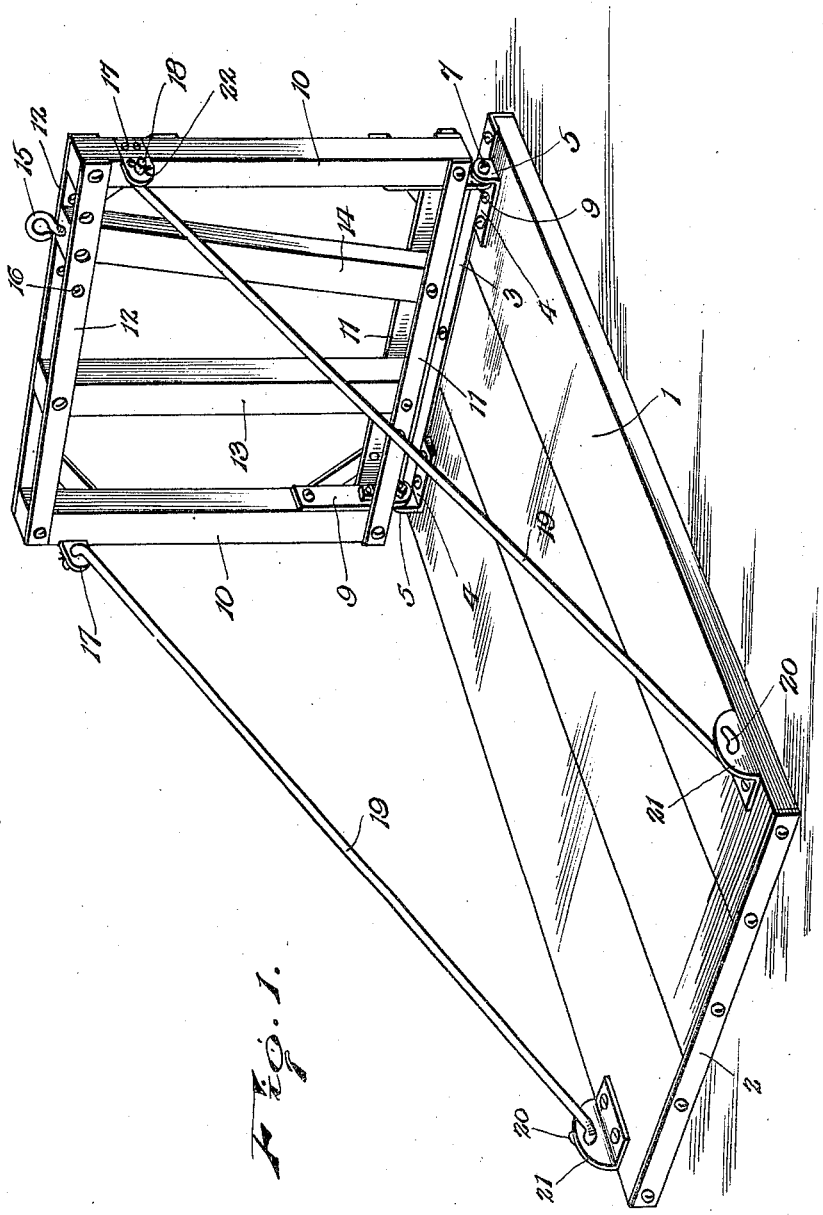

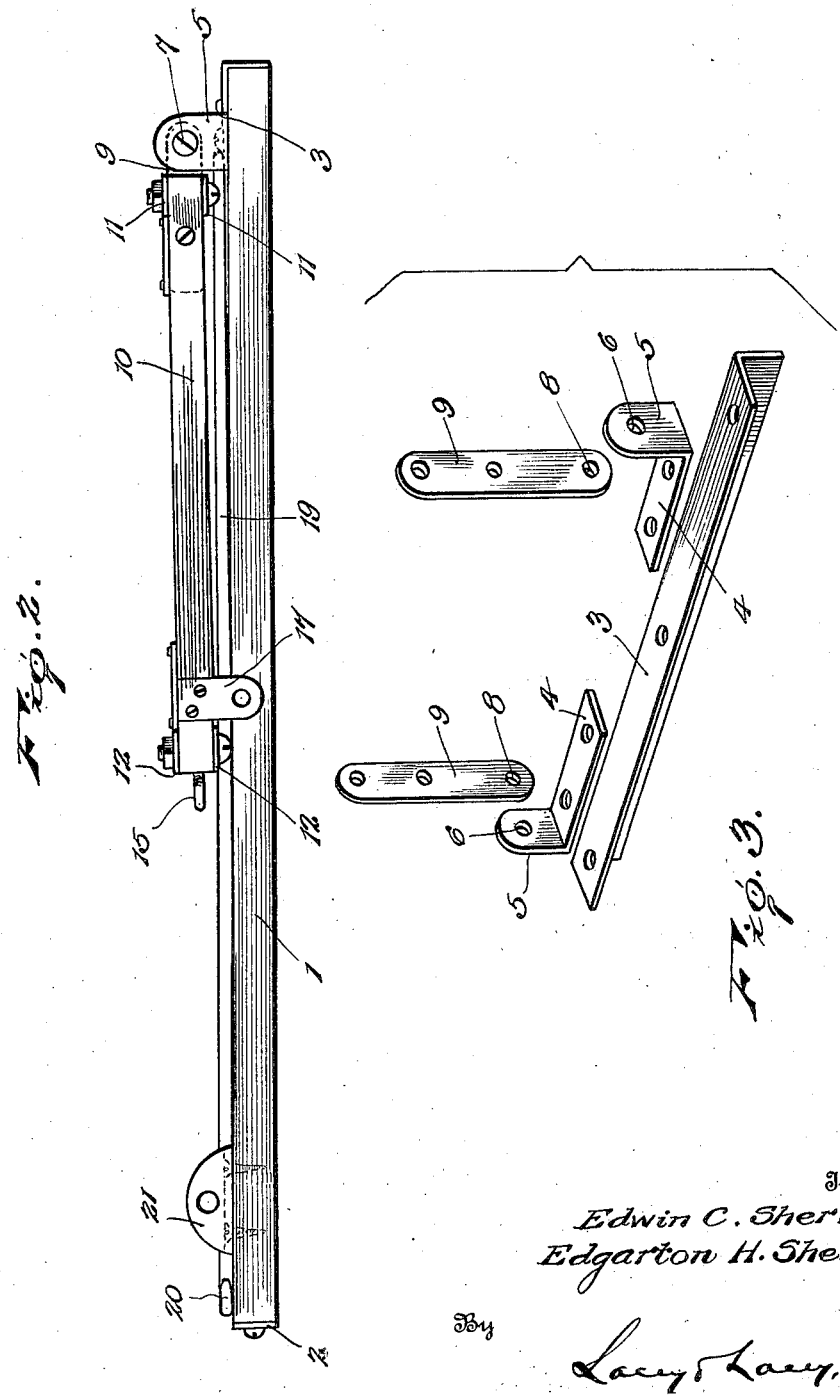

EDWIN C. SHERWIN AND EDGARTON H. SHERWIN, OF BRANDON, WISCONSIN.

STANCHION.

1,402,902.  Specification of Letters Patent.  Patented Jan. 10, 1922.

Application filed February 26, 1921. Serial No. 448,128.

*To all whom it may concern:*

Be it known that we, EDWIN C. SHERWIN and EDGARTON H. SHERWIN, citizens of the United States, residing at Brandon, in the county of Fond du Lac and State of Wisconsin, have invented certain new and useful Improvements in Stanchions, of which the following is a specification.

This invention relates to stanchions and has for its object the provision of a substantial but inexpensive stanchion which may be easily placed within a wagon for transportation and when the animal confined in the stanchion has been delivered at its destination, may be readily folded in compact form for return shipment.

It frequently happens that a stock raiser or farmer has a sale for a single animal and, under the present practice, this animal is loaded into a wagon and secured by ropes, necessitating a laborious and time-consuming operation as well as frequently causing discomfort and annoyance to the animal. Our invention provides a simple device which may be readily loaded into a wagon and will be held in position by the weight of the animal and will restrain the animal without discomfort. After the animal has been delivered, the device may be folded into a small compass so that it will not in any way diminish the capacity of the wagon for carrying a return load of any commodities. The invention is illustrated in the accompanying drawings and will be hereinafter fully set forth.

In the drawings—

Figure 1 is a perspective view of our improved stanchion showing it set up for use;

Fig. 2 is an edge elevation showing the device in folded form;

Fig. 3 is a detail perspective view of the elements whereby the head frame is pivotally connected with the base.

In carrying out our invention, we employ a base 1 which may be a single element or may consist of a plurality of boards secured together but should be of such dimensions that it will fit easily within a wagon box and rest firmly upon the bottom of the same. The ends of the platform may be reinforced by metallic plates, as indicated at 2 and 3, and these plates rigidly connect the boards forming the platform or base. Upon the upper side of the platform at one end thereof and adjacent the side edges of the same, we secure brackets consisting of base members 4 and upturned ends 5. The said upturned ends or lugs 5 are provided with perforations 6 therethrough and pivot pins 7 are inserted through the said openings and similar openings 8 in the lower ends of attaching plates 9. The said attaching plates are each firmly secured to the inner side of end posts 10 constituting the side members of the head frame of the stanchion, and secured rigidly to and connecting the lower ends of the said posts are metallic straps 11 which prevent spreading of the posts and relieve the strain upon the bolts or rivets by which the attaching plates 9 are secured to the posts. Similar straps 12 are secured to and connect the upper ends of the posts 10, and disposed between the straps are the stanchion bars 13 and 14, the bar 13 being rigidly secured at its ends to the respective straps, as clearly shown in Fig. 1, and the bar 14 being pivoted at its lower end to and between the straps 11 and having its upper end playing between the straps 12. A handle member 15 of any preferred form is provided at the upper end of the pivoted stanchion bar 14 so that the said bar may be moved toward or from the neck of the animal in the usual manner. Registering openings 16 are formed through the straps 12 and a locking pin of any convenient form is to be inserted through registering openings against the outer side of the pivoted bar 14 to hold the same in its set position. Upon the outer sides of the end posts 10, near the upper ends thereof, we secure brackets 17 which project beyond the rear sides of the said posts, as clearly shown. The ends of the brackets 17 are perforated and in the said perforations we engage the upper laterally turned extremities 18 of brace rods 19 which have their rear ends formed into hooks 20 engaged in suitable openings formed in the upstanding lugs 21 on the base or platform 1 adjacent the rear end of the same.

It is thought the use of the device will be evident from the foregoing description, taken in connection with the accompanying drawings. When an animal is to be transported the stanchion is loaded into a wagon box and the base or platform 1 will rest flat upon the bottom of the box. The head frame is swung into an upright position, as shown in Fig. 1, and the brace bars 19 are brought into such position that their lateral forward extremities 18 may be engaged through the openings provided therefor in the brackets 17. Cotter pins or similar devices 22 are fitted through the extremities of the bars so as to prevent the accidental withdrawal of the same from their engagement with the brackets. The animal is then driven into the wagon box and will assume a position on the platform or base 1, the weight of the animal holding the platform firmly in the wagon box. The head of the animal is inserted between the bars 13 and 14 and the movable bar 14 is then swung close to the neck of the animal and held in that position by a pin or other instrument inserted through the registering openings 16 in an obvious manner. After the animal has been sold and has been removed from the wagon box, the fasteners or retaining devices 22 are removed and the brace bars released from the brackets 17. The head frame may then be swung down upon the platform or base, as shown in Fig. 2, and the brace bars may be permitted to rest upon the head frame, as shown in Fig. 2, or may be withdrawn from the lugs 21 and placed in the wagon box alongside the folded stanchion, but, however the brace bars may be disposed, it is evident the folded stanchion will occupy but very little space and may be placed upon the top of a load placed in the wagon.

The device is exceedingly simple in its construction and the arrangement of its parts and may be readily manipulated by anyone.

Having thus described the invention, what is claimed as new is:

A stanchion comprising a platform, a pair of spaced hinge lugs in the forward end and a pair of spaced perforated brackets at the rear end thereof; a frame consisting of two side posts, a pair of straps secured exteriorly to the top ends of said posts, another pair of straps similarly secured to the bottom ends of the said posts, a stationary stanchion bar secured between said straps, a movable stanchion bar provided with a handle at the top and hinged between the bottom straps, means for adjustably securing the upper end of the movable stanchion bar between the top straps, rearwardly extending perforated lugs attached adjacent the top of said posts; attaching plates secured on the inner side of said posts and provided with eyelets extending below the posts, pivot pins detachably connecting said eyelets with said hinge lugs and a pair of bracing rods with hooked ends adapted to connect said brackets and said perforated lugs.

In testimony whereof we affix our signatures.

EDWIN C. SHERWIN. [L. S.]
EDGARTON H. SHERWIN. [L. S.]